Aug. 3, 1965  D. J. HARVEY  3,197,862
METHOD AND APPARATUS FOR PRODUCING A FINE-GRAIN SOLDER
Filed Jan. 8, 1963  4 Sheets-Sheet 1

Fig. 1

INVENTOR.
Douglas J. Harvey
BY
ATTORNEY

Aug. 3, 1965        D. J. HARVEY                3,197,862
       METHOD AND APPARATUS FOR PRODUCING A FINE-GRAIN SOLDER
Filed Jan. 8, 1963                           4 Sheets-Sheet 2

INVENTOR.
Douglas J. Harvey
BY
G. N. Shampo
ATTORNEY

Aug. 3, 1965 D. J. HARVEY 3,197,862
METHOD AND APPARATUS FOR PRODUCING A FINE-GRAIN SOLDER
Filed Jan. 8, 1963 4 Sheets-Sheet 3

INVENTOR.
Douglas J. Harvey
BY
G. N. Shampo
ATTORNEY

Aug. 3, 1965  D. J. HARVEY  3,197,862
METHOD AND APPARATUS FOR PRODUCING A FINE-GRAIN SOLDER
Filed Jan. 8, 1963  4 Sheets-Sheet 4

INVENTOR.
Douglas J. Harvey
BY
G. N. Shampo
ATTORNEY

United States Patent Office 3,197,862
Patented Aug. 3, 1965

3,197,862
METHOD AND APPARATUS FOR PRODUCING A FINE-GRAIN SOLDER
Douglas J. Harvey, Utica, Mich., assignor to General Motors Corporation, Detroit, Mich., a corporation of Delaware
Filed Jan. 8, 1963, Ser. No. 250,463
13 Claims. (Cl. 29—528)

This invention relates to a process and apparatus for producing a fine-grain, lead-base solder for use as a filler material for automobile bodies and the like. More particularly, it pertains to forming a very fine texture in a lead-antimony-tin-arsenic solder by rapidly cooling the cast solder before and during solidification in combination with subsequent plastic working. The present patent application is a continuation-in-part of United States patent applications Serial Nos. 11,942 and 210,260, which were filed on December 14, 1959, and July 16, 1962, and now abandoned, respectively.

Low tin content lead-base automobile body filler solders commonly used today are excessively grainy or coarse-textured. This graininess results from the composition of the solder, the method of producing it, or a combination of both factors. When a lead-base filler solder of this type is applied to an automobile body, the resultant solder surface inevitably also is coarse textured. Coarse-grained solders are difficult to apply because they have a very narrow useful wiping temperature range. Moreover, these solders tend to tear, shrink and undergo liquid-solid separation during application, thereby producing undesirable voids. The tendency of the solid and liquid phases to separate also makes manipulation of the semi-liquid solder exceedingly difficult.

Accordingly, a principal object of the present invention is to provide a filler solder for sheet steel automobile bodies and the like which has a relatively fine-grained structure, both as prepared and during subsequent usage. Such a solder is produced in accordance with the present invention by a process involving rapidly cooling a lead-tin-antimony solder before and during solidification of the solder casting and thereafter plastic working the cast solder such as by pressing, rolling or extrusion. Excellent results have been obtained with a solder alloy consisting essentially of about 4.5% to 6% antimony, 0.3% to 0.6% arsenic, 0.25% to 3.5% tin and the balance substantially all lead. A small amount of copper also may be included in the alloy.

In one embodiment of the invention apparatus is provided for melting a lead-base solder, casting it into a continuous strip of relatively small cross-sectional area, rapidly cooling the strip before and during solidification of the solder, and cold working the cast solder strip by a pressing operation. Specifically, a molten lead-base body filler solder, preferably of the aforementioned composition, is transferred from a melting furnace via a pouring basin to a water-cooled annular groove on the upper horizontal surface of a rotating casting wheel. The solder rapidly solidifies in the groove and is carried in continuous strip form to a press by means of guide rollers. In this manner, the solder is rapidly cast, pressed into thin strip form and cut to proper size for convenient use.

Other objects and advantages of this invention will more fully appear from the following detailed description, reference being made to the accompanying drawings in which.

Automobile body filler solders are prepared for use by heating them to a temperature at which they become semi-molten. It is not possible to satisfactorily apply these solders at all temperatures in the range between the solidus and liquidus. The maximum useful application temperature for the lead-base solder described above has been found to be between 490° F. and 525° F. When such a solder is applied, it is heated to a temperature which melts the ternary eutectic of lead, antimony and tin and all or part of the formed tin-antimony compound. Near the higher end of the aforementioned 490° F. to 525° F. temperature range, some of the lead-rich phase also is melted. Heating an alloy of this composition above the liquidus temperature initiates agglomeration and growth by diffusion of individual phases. Accordingly, the fineness of the phase constituents in a bar solder of this type determines the minimum grain size of the solder when it is being applied. This agglomeration and growth of the solid particles continues with time and is accelerated by increases in temperature. Thus, in order to maintain a fine texture of the solder during application, time and temperature must each be kept to a minimum. If the solder becomes entirely molten while it is being applied, it will invariably solidify with a coarse-grained structure. Moreover, such a grainy solder is very difficult to use because the size of the pores formed between the solid grains of the semi-liquid solder is so large that the liquid tends to separate from the solid phases.

A typical lead-base cast bar solder which is permitted to solidify at a relatively slow rate during preparation contains large crystals of the lead-rich phase. Such a solder invariably is excessively grainy regardless of how carefully it is applied to the work. While the properties of a bar of this type can be improved somewhat by extrusion, it is vertually impossible to break up hard particles of tin-antimony compound in the solder because of the softness of the surrounding matrix.

Figure 1:
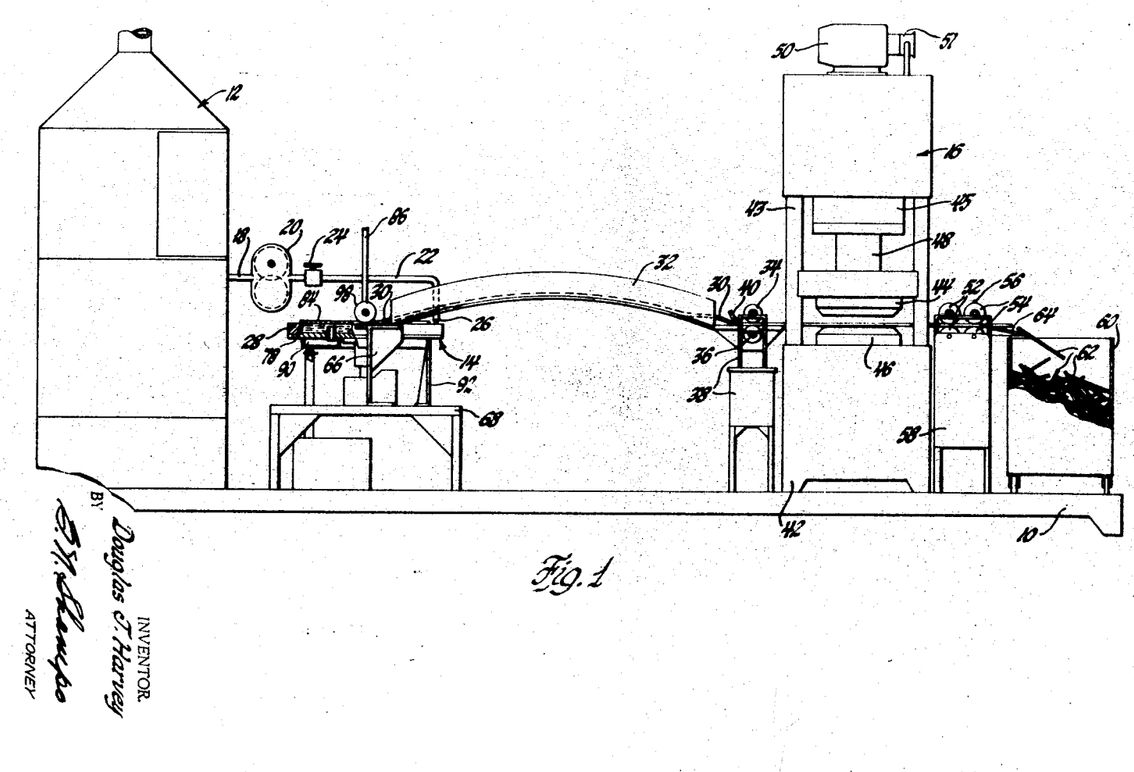
FIGURE 1 is a side elevational view, with parts broken away and in section, showing the apparatus of the present invention.

Referring now to the drawings, FIGURE 1 shows an apparatus for producing a lead-base automobile body filler solder having a fine-grained structure and which is easily and effectively applied to the joints of automobile bodies. This apparatus includes a base 10 on which is mounted a melting furnace 12, a casting table 14 for continuously producing solder in strip form, and a vertical press 16 for cold working the solder strip. When used in large automobile body plants, the melting furnace, which conveniently may be gas fired, preferably should be capable of melting and superheating the solder to a temperature of approximately 800° F. and processing up to 2,000 pounds of solder per hour.

The outlet 18 from the melting furnace is connected to a pump 20 which transfers the molten solder from the furnace through a discharge tube 22 to the casting table 14. If desired, the discharge tube may be insulated to retain the molten solder at proper temperature and prevent clogging of the tube. A needle valve 24 is shown as located in the discharge tube between the pump and the outlet end 26 of the tube. This valve may be used in conjunction with the pump to regulate the flow of molten solder, and it also may be employed to cut off the flow of solder completely when solder production is being discontinued for a short period of time. It also is possible to gravity-feed the solder from the furnace to the casting table and to use a pouring basin containing a float which maintains the solder in the pouring basin at a constant level.

The molten solder thus is transferred from the melting furnace to a water-cooled annular mold 28 on the upper surface of the rotatable portion of the casting wheel or table 14 where the solder rapidly solidifies into the form of a continuous strip 30. This strip is continuously removed from the annular mold by the rotation of the casting table and is conveyed through a generally horizontal trough 32. Movement of the solder strip 30 is further assisted by a set of horizontally mounted constant speed guide rollers 34 and 36 supported on a framework 38 attached to the base 10. The bottom roller 36 functions as a drive roller, while the top roller is an idler roller which maintains constant pressure on the solder strip. A guide bar 40 is shown as mounted on the framework 38 and serves to direct the solder strip between the drive roller and the idler roller.

A suitable lever and linkage arrangement (not shown) may be connected to the base 42 or the vertical support member 43 of the press 16 to cooperate with the upper guide roller 34 and the movable upper die 44 of the press. Such an arrangement permits downward movement of the die 44 to actuate a lever which raises the upper roller 34 out of contact with the solder strip 30. In this manner, when the portions of the solder strip within the press and between the guide rollers and the press are stationary during the cold working operation, the drive roller 36 continues to turn but does not cause further movement of the strip. However, it is not necessary to stop the rotation of the casting table 14 during the short period of time the press prevents movement of the solder strip. The strip being removed from the rotating casting table continues to be fed into the trough 32, and the vertically extending walls of the trough are sufficiently high so that a slack loop of solder strip is provided within the trough between the casting table and the guide rollers. The slack in the strip is substantially taken up when the upper movable die is raised to permit more rapid insertion of the strip into the press.

As shown in FIGURE 1, the stationary lower die 46 of the hydraulic press 16 is supported on the press base 42 and the solder strip 30 is transported over the upper surface of the stationary die. The vertically extending frame members 43 of the press support a hydraulic cylinder 45 in which a piston or ram 48 reciprocates. The upper die 44 is attached to the lower end of the ram and is thus moved vertically into and out of contact with the solder strip. The hydraulic fluid in the cylinder is pumped by means of a pump 51 driven by an electric motor 50 mounted on top of the press. For certain production applications, it may be advantageous to employ a crank-type press in which the vertically movable upper die 44 is secured to the lower end of the crankarm. Such a press normally would have a heavy flywheel attached to a horizontally mounted crankshaft.

After the movable die 44 is raised following pressing of the solder strip 30, the strip is moved forward a distance approximately equal to the width of the die faces. Hence, when the vertical die again descends, it compresses the adjacent unworked portion of the strip so that the strip becomes continuously reduced in thickness.

The cold worked solder strip is forced from between the parted dies through two sets of horizontally mounted rollers 52 and 54 which guide the solder strip from the press. The two lower rollers serve as driving wheels, while the upper roller 54 contains an axially extending blade 56 on its periphery. As with the guide rollers 34 and 36, the rollers 52 and 54 are suitably regulated so that they do not attempt to move the solder strip while it is being cold worked in the press. This is most readily accomplished by separating the two upper rollers from the drive rollers during this period. The blade 56 cuts the cold worked solder strip into convenient lengths, the diameter of the upper roller 54 regulating the length of the flat solder bars 62.

As shown in FIGURE 1, the rollers 52 and 54 are supported by an appropriate frame 58 connected to the base 10. A movable container or bin 60 is located adjacent these rollers so that after the flat solder bars 62 are cut into proper lengths, they slide down a short discharge chute 64 into the bin.

Figure 2:
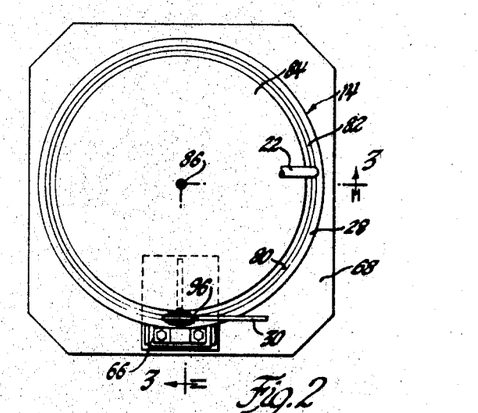
FIGURE 2 is an enlarged top elevational view of the rotating casting table shown in FIGURE 1.
Figure 3:
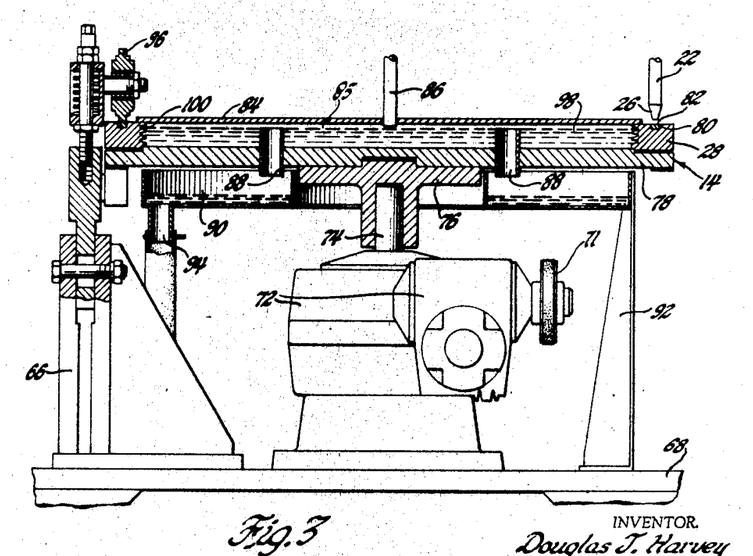
FIGURE 3 is an enlarged sectional view with parts shown in elevation along the line 3—3 of FIGURE 2.

Referring now to FIGURES 2 and 3, it can be seen that the casting table 14 has a stationary framework 66 mounted on a lower support 68 which, in turn, is connected to the base 10. A double reduction gearbox 72, driven by an electric motor (not shown) connected to a pulley 71, is mounted on the support 68 within the framework 66. This motor and gearbox rotate a vertically extending shaft 74 at constant speed. Rigidly secured to the upper end of this shaft by a shrink fit or other suitable means is a collar or hub 76 having its upper surface attached to a circular metal plate 78 which serves as a bottom wall of the rotatable wheel portion of the casting table. The annular metal mold 28, which preferably is formed of copper, is affixed to the upper surface of the plate 78 adjacent its periphery. An annular groove 80 is provided in the top of the mold and constitutes the casting cavity for the molten solder 82. Hence it will be seen that the motor and gearbox rotate the wheel portion of the casting table at a constant speed in a counter-clockwise direction as viewed from above, while the molten solder is continuously being transferred from the furnace 12 through the discharge tube 22 to the annular casting cavity 80 in the water-cooled metal mold 28.

A metal plate 84 is shown as affixed to the radially inner edges of the upper surface of the open-faced annular casting mold. The plates 78 and 84 and the mold 28 thus form a generally cylindrical chamber or water jacket 85 into which cooling water 98 is continuously introduced through down pipe 86. The excess coolant continuously flows from the water jacket through overflow tubes 88 into a stationary annular catch basin 90 supported above the motor 70 and the gearbox 72 by frame members 92 attached to the upper surface of the support 68. A downwardly extending outlet pipe 94 conveys the cooling water from the catch basin. The framework 66 is shown as supporting a suitably spring-mounted guide roller 96 which retains the solder strip 30 in position and helps guide it into the trough 32.

As the movable wheel portion of the casting table rotates at constant speed, the molten solder rapidly solidifies in the annular groove 80 of the water-cooled metal mold 28. As shown in FIGURE 3, the inner circumferential surface of the annular mold is provided with a series of radially extending cooling fins 100. These fins substantially increase the area of contact between the mold and the cooling water to provide for more rapid dissipation of the heat from the molten solder. The solder cools sufficiently during a ¾ of a revolution of the casting table so that it can be removed without damage as a continuous strip.

Of course, it is possible to increase the output of the apparatus described above by providing the upper surface of the metal mold 28 with two or more annular grooves or die cavities 80. However, sufficiently high production rates normally can be maintained with a single casting cavity.

A generally rectangular casting cavity ⅜ inch wide by ¼ inch deep provides excellent results when producing solder of the type hereinafter described. Since the molten solder is introduced into the annular mold at a rate which prevents overflow of the metal, the continuous solder strip thus cast has substantially the same cross-sectional dimensions as the mold cavity. The press 16 preferably is designed to reduce the thickness of this strip to approximately ⅛ inch when the strip is cut into 12-inch lengths. The resultant thin solder bars are approximately ¾ inch in width and weigh about 0.43 pound per linear foot. Accordingly, on the basis of a production rate of 1,000 pounds of solder per hour using a casting table having a single mold cavity, the solder strip is designed to move at a rate of approximately 39 linear feet per minute. A 24-inch diameter casting wheel, which has proved to be a convenient size, would have to rotate at a speed of about 6.4 revolutions per minute to maintain this production rate. With the apparatus described above, the solder is permitted to remain on the casting wheel through approximately 270 degrees of rotation, and the cooling time in the chilled copper mold thus would be about seven seconds. If a somewhat slower cooling rate is desired, a 36-inch wheel can be rotated at 4 r.p.m. to produce 1,000 pounds of solder strip per hour with a single strip mold. The solder would cool on the casting wheel for approximately eleven seconds with this arrangement.

In general, therefore, I have found it preferable to use a press which will reduce the thickness of the solder strip at least 25%. Of course, the cast strip should not be pressed to such an extent that its very thickness makes it difficult for the operator to properly apply it to the workpiece. A solder bar which is too thin has a tendency to readily melt and form large grains when it is being applied. It is therefore frequently impractical to reduce the thickness of the lead-base alloy solder strips more than about 75%. Hence, solder which is cast into the form of a strip ¼ inch thick normally should be pressed to a sufficient extent to produce finished solder bars having thicknesses of ³⁄₁₆ inch to ¹⁄₁₆ inch. As indicated above, a lead-base alloy solder which has proved to be particularly useful in accordance wtih the present invention is an alloy consisting essentially of about 4.5% to 6% antimony, 0.3% to 0.6% arsenic, 0.25% to 3.5% tin and the balance lead. Copper not in excess of approximately 0.05% and a small quantity of sulphur also may be present in the alloy. If the copper content is greater than 0.05%, it tends to cause drossing when the solder is melted before casting into strip form or extrusion bars.

A solder containing about 5% to 5.25% antimony, 2% to 2.75% tin and 0.45% to 0.6% arsenic is generally preferred. When an alloy of this composition is cast into bars, as is frequently done with lead-tin solders, it is almost impossible to use it successfully in the as-cast condition because of its coarse grain structure. The liquidus of an alloy composed of 5% antimony, 2.5% tin, 0.5% arsenic and the balance lead is approximately 542° F., and solidification of the molten alloy begins at this temperature by the precipitation of a lead-rich phase which appears to be nucleated by a reaction between the lead and arsenic. Crystal growth of this lead-rich phase continues as the temperature of the solder drops to about 480° F., at which time precipitation of a tin-antimony compound is initiated. Precipitation of this compound continues until the temperature of the cooling solder is lowered to approximately 465° F. At this temperature the remaining liquid freezes by a ternary reaction involving the lead-rich phase, the tin-antimony compound and an antimony-rich phase.

Figure 4:
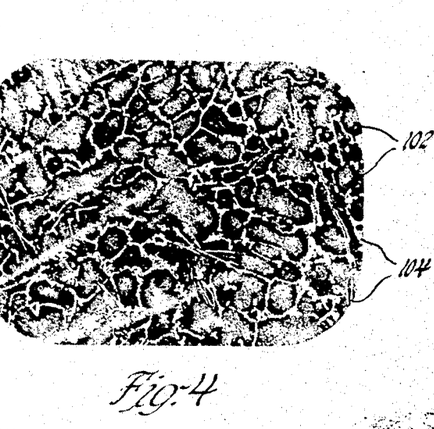
FIGURE 4 is a photomicrograph at 100 magnifications of a section of an automobile body filler solder consisting of about 2.5% tin, 5% antimony, 0.5% arsenic and the balance lead, showing the coarse-grained microstructure of the solder in the as-cast condition when a conventional, relatively slow cooling rate has been employed.
Figure 5:
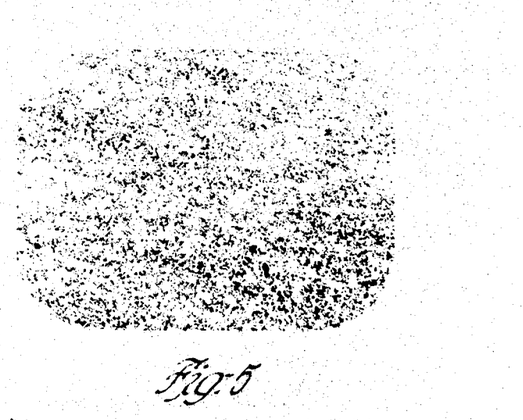
FIGURE 5 is a photomicrograph at 100 magnifications of a section of the coarse-grained solder shown in FIGURE 4 after extrusion.

When a solder of this type is cast in conventional manner in an unchilled or nonmetallic mold, it exhibits the coarse-grained microstructure shown in FIGURE 4. Although extrusion of bar stock of such an alloy reduces the size of the crystals in the solder, as shown in FIGURE 5, such a solder nevertheless is sufficiently coarse-grained to preclude its being used in an entirely satisfactory manner. This can be seen from the photomicrograph of FIGURE 6, which shows the relatively large crystals formed when the solder is applied to the workpiece. The alloy solder shown in FIGURES 4 through 6 was formed by casting a 1-inch diameter bar in an uncooled nonmetallic mold, thereby forming coarse crystals of the lead-rich phases 102 with a network of large particles of tin-antimony compounds 104. A solder having the microstructure shown in FIGURES 4 and 5 will always be excessively grainy regardless of how carefully it is applied.

Figure 7:
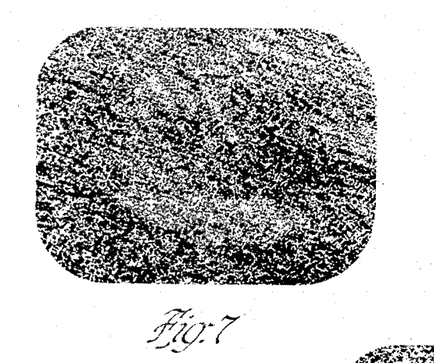
FIGURE 7 is a photomicrograph at 100 magnifications of a section of an automobile body filler solder having the same composition as the solder shown in FIGURES 4, 5 and 6, but which has been cast with controlled rapid cooling in accordance with the present invention.
Figure 8:
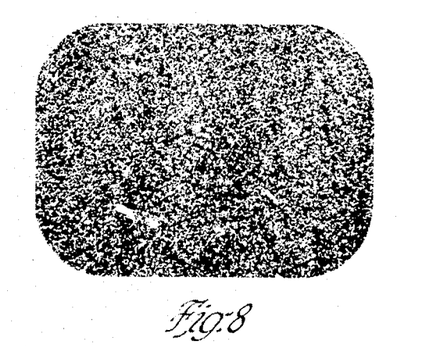
FIGURE 8 is a photomicrograph at 100 magnifications of a section of the rapidly cooled cast solder shown in FIGURE 7 after extrustion.

FIGURE 5 shows that the microstructure of the slowly cooled bar specimen has a relatively coarse-grained microstructure even after being subjected to rather extensive extrusion operations. For example, this solder still contains rather large particles of the tin-antimony compounds 104 and coarse crystals of the lead-rich phases 102. On the other hand, when an alloy having the same composition is cast in a 1-inch diameter polished steel mold, the resultant solder has the fine-grained microstructure shown in FIGURE 7. This microstructure can be conveniently and inexpensively obtained by means of the apparatus illustrated in FIGURES 1, 2 and 3. The fine-grain microstructure results because the rapid cooling nucleates solidification and produces a much finer dispersion of the phase particles. Extruding such a cast bar into a ¼-inch diameter wire further improves its microstructure, as shown in FIGURE 8. A virtually identical microstructure is produced when a rapidly cooled cast strip of the solder alloy is cold work in the vertical press 16 to substantially reduce its thickness. A solder bar of this type has greatly improved wiping characteristics and a considerably wider useful application temperature range.

I have found that best results can be obtained in accordance with the present invention by cooling the cast solder above the liquidus at a rate greater than 20° F. per second. In general, a liquid cooling rate of at least 40° F. per second is preferred. In the temperature zone between the liquidus and solidus, the cast solder may be cooled somewhat more slowly, but in all instances the cooling rate should exceed approximately 6° F. per second with a rate above 12° F. per second being preferred. The rate of cooling below the solidus is relatively unimportant, but the solder should be retained at a reasonably low temperature during the subsequent extrusion, rolling or pressing operation.

Referring again to the photomicrographs shown in the drawings, the pre-extrusion microstructure of the specimen shown in FIGURE 4 was produced by cooling a cast solder bar at the ordinary cooling rate of about 2° F. per second above the liquidus (542° F.) and about 0.3° F. per second between the liquidus and solidus (542° F. to 465° F.). The difference between this microstructure and that illustrated in FIGURE 7 is readily apparent. The latter shows the microstructure of a cast body solder of the same composition which was cooled at the rate of 40° F. per second above the liquidus and 12° F. per second in the range between the liquidus and solidus.

The aforementioned high cooling rates can be obtained by casting the solder in cooled steel or copper molds, with a water-cooled copper mold proving to be particularly effective. Consistently excellent results are produced with a lead-base alloy solder strip of the aforementioned composition which is cooled at the preferred cooling rates in the above-described rotating mold.

If the cast solder is cold worked by extrusion or rolling rather than by pressing, I have found it advantageous to extrude or roll the cast bar sufficiently to reduce its cross-sectional area at least 75%. Reduction of the bar to about 1/16 of its original cross-sectional area has proved to be particularly effective in providing the alloy solder with a fine grain structure. Of course, the cast bar should not be extruded or rolled so extensively that its very thinness makes it difficult for the operator to properly apply it to the workpiece. A solder wire which is too thin has a tendency to readily melt and form larger grains when it is being applied.

Thus it will be seen that, with respect to the cold working step, it is necessary to change the dimensions of the cast solder bar or strip to a considerable extent in order to produce the desired fine-grained final microstructure. As indicated above, if only one linear dimension in a cross-sectional plane of the bar or strip is measurably reduced, as in the case of a pressing operation, this reduction should be at least 25%. However, if both the width and thickness of a cast solder bar or strip are reduced (or the diameter is reduced in the case of an extrusion bar), the reduction in cross-sectional area preferably should be at least 75%.

Figure 6:
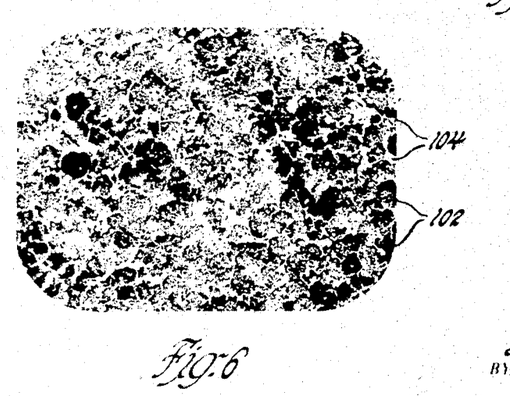
FIGURE 6 is a photomicrograph at 100 magnifications of a section of the solder shown in FIGURES 4 and 5 after application to the part being soldered.
Figure 9:
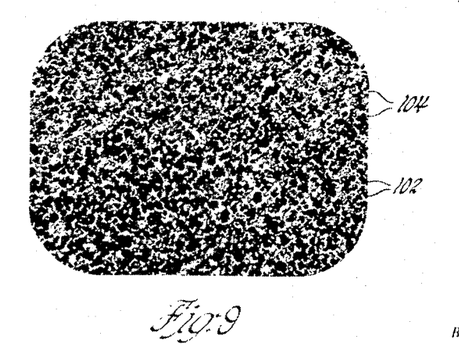
FIGURE 9 is a photomicrograph at 100 magnifications of a section of the fine-grained body filler solder shown in FIGURES 7 and 8 after it has been applied to the part being soldered.

Attention is particularly called to the differences in microstructure between the solder specimens shown in FIGURES 6 and 9. The former coarse-grained specimen, after wiping, contains fewer than 3,000 grains per cubic millimeter. On the other hand, a body filler solder having the identical composition which is processed in accordance with this invention has a considerably finer grain structure after application to the work. For example, the solder speciment shown in FIGURE 9 contains more than 23,000 grains per cubic millimeter. Moreover, the voids, which are clearly exhibited in the specimen shown in FIGURE 6, are typical of an excessively grainy solder and are caused by liquid-solid separation and/or shrinkage. When both types of solders are semi-molten, the fine-grained solder shown in FIGURE 9 has more than twice the grain surface area as the coarse-grained solder. Consequently, the fine-grained alloy is capable of holding a considerably greater amount of liquid without separation. Of course, the alloy solder shown in FIGURE 9 also has a much smoother and finer texture during wiping.

It is recognized, of course, that heating any high lead content body filler solder above the liquidus temperature during application will cause it to become grainy. Consequently, care should be exercised during application of even the new improved solder to prevent it from becoming over-heated. However, as compared with conventional high lead content body solders, a solder produced in the above-described manner in accordance with this invention will withstand considerably high temperatures while it is being applied without becoming grainy.

Specifically, I have melted a 500-pound heat of an alloy solder consisting of 4.08% tin, 3.04% tin, 0.6% arsenicc and the balance lead and cast this alloy into 10-pound pigs. These small pigs were then re-melted and cast into 1-inch diameter water-cooled cooper molds using a pouring temperature of about 8000° F. After trimming the pipes from the cast slugs, they were extruded into solder bars having a cross section of 1/8 inch x 3/4 inch. A mechanical press operating at a speed of 50 strokes per minute was used to perform the extrusion operation.

The solder thus produced and a solder having the same composition formed in exactly the same manner, except for the omission of rapid cooling in the casting step, were used to solder rocker panel joints of a large number of automobile bodies. Since low tin content body solders do not satisfactorily wet steel, the areas of the body panels to be soldered were pre-tinned in the usual manner. A mixture of flux, such as zinc ammonium chloride plus a wetting agent, and powdered lead-tin alloy solder is useful for pre-tinning. An alloy of 75% lead and 25% tin has proved to be particularly successful. The steel panels were first wire brushed, and a slurry of the powdered alloy and flux was then applied in a thin layer to each panel. After the excess high tin material was wiped off, the low tin content lead base solder was applied to the wetted steel surface.

Careful examination and evaluation of the resultant soldered joints showed that the body filler solder which had been cast into bar stock using conventional cooling rates and sebsequently extruded contained 2.1 times as many defects as the joints formed from solder produced in accordance with this invention. Furthermore, it was found that the latter solder was easier to apply and produced appreciably less loading of the abrasive paper used to finish the soldered areas. As indicated above, the solder produced by this invention also exhibited considerably fewer voids during the metal finishing operation.

While the present invention has been described by means of certain specific examples, it will be understood that the scope of the invention is not to be limited thereby except as defined in the following claims.

I claim:

1. A method of producing a fine-grained, lead-base solder which comprises forming a molten alloy consisting essentially of about 4.5% to 6% antimony, 0.3% to 0.6% arsenic, 0.25% to 3.5% tin and the balance substantially all lead, pouring said molten alloy into a mold, cooling said alloy in said mold at a rate or more than 20° F. per second above the liquidus temperature of said alloy and at a rate in excess of 6° F. per second in the temperature range between the liquidus and solidus temperatures of said alloy, and thereafter working the resultant casting to reduce its cross-sectional area at least 75%.

2. A method of producing a fine-grained solder for ferrous metal which comprises forming a molten alloy consisting of about 4.5% to 6% antimony, 0.3% to 0.6% arsenic, 0.25% to 3.5% tin and the balance substantially all lead, pouring said molten alloy into a chilled metal mold which cools the alloy at a rate of more than 20° F. per second above the liquidus temperature of said alloy and at a rate in excess of 6° F. per second in the temperature range between the liquidus and solidus temperatures of said alloy, and thereafter working the resultant casting to reduce its cross-sectional area at least 75%.

3. A method of producing a fine-grained solder for ferrous metal which comprises preparing a melt of an alloy consisting essentially of about 4.5% to 6% antimony, 0.3% to 0.6% arsenic, 0.25% to 3.5% tin and the balance substantially all lead, casting said molten alloy at a temperature of about 775° F. to 825° F. into a chilled metal mold, cooling said alloy while in said mold at a rate of more than 20° F. per second above the liquidus temperature of said alloy and at a rate in excess of 6° F. per second in the temperature range between the liquidus and solidus temperatures of said alloy, and thereafter extruding the resultant casting into a solder bar.

4. A method of producing a fine-grained filler solder for sheet metal automobile bodies and the like which comprises preparing a molten alloy consisting essentially of about 5% to 5.25% antimony, 0.5% to 0.6% arsenic, 2% to 2.75% tin and the balance substantially all lead, casting said molten alloy into pigs, thereafter re-melting said pigs and pouring them at a temperature of about 775° F. to 825° F. into metal molds which cool said alloy at a rate of more than 20° F. per second above the liquidus temperature of said alloy and at a rate in excess of 6° F. per second in the temperature range between the liquidus and solidus temperatures of said alloy, and subsequently extruding the castings thus produced to reduce their cross-sectional areas at least 75% and form solder bars.

5. A method of producing a fine-grained, lead-base solder bar which comprises forming a molten alloy consisting essentially of about 4.5% to 6% antimony, 0.3% to 0.6% arsenic, 0.25% to 3.5% tin and the balance substantially all lead, pouring said molten alloy at a temperature of about 775° F. to 825° F. into a fluid-cooled metal mold, cooling said alloy in said mold at a rate of more than 40° F. per second above the liquidus temperature of said alloy and at a rate in excess of 12° F. per second in the temperature range between the liquidus and solidus temperatures of said alloy, and subsequently working the solidified alloy to reduce its cross-sectional area at least 75% and form a solder bar.

6. A method of producing fine-grained filler solder bars for use on sheet steel automobile bodies and the like which comprises forming a molten alloy consisting essentially of about 5% to 5.25% antimony, 0.5% to 0.6% arsenic, 2% to 2.75% tin and the balance substantially all lead, casting said molten alloy into pigs, re-melting said pigs and pouring them at a temperature of about 775° F. to 825° F. into water-cooled copper molds, said molds being maintained at a sufficiently low temperature to cool said alloy at a rate of more than 40° F. per second above the liquidus temperature of said alloy and at a rate in excess of 12° F. per second in the temperature range between the liquidus and solidus temperatures of said alloy, and thereafter extruding the resultant castings to reduce their cross-sectional areas at least 75% and form solder bars.

7. A method of producing a fine-grained, lead-base solder which comprises forming a molten alloy consisting essentially of about 4.5% to 6% antimony, 0.3% to 0.6% arsenic, 0.25% to 3.5% tin and the balance substantially all lead, pouring said molten alloy into a mold, cooling said alloy in said mold at a rate of more than 20° F. per second above the liquidus temperature of said alloy and at a rate in excess of 6° F. per second in the temperature range between the liquidus and solidus temperature of said alloy, and thereafter further refining the grain structure of the resultant casting by working said casting to reduce one of its transverse linear dimensions at least 25%.

8. A method of producing a fine-grained solder for ferrous metal which comprises preparing a melt of an alloy consisting essentially of about 4.5% to 6% antimony, 0.3 % to 0.6% arsenic, 0.25% to 3.5% tin and the balance substantially all lead, casting said molten alloy at a temperature of about 775° F. to 825° F. into a chilled metal mold, cooling said alloy while in said mold at a rate of more than 20° F. per second above the liquidus temperature of said alloy and at a rate in excess of 6° F. per second in the temperature range between the liquidus and solidus temperature of said alloy, and thereafter further refining the grain structure of the resultant casting by cold working said casting to reduce one of its transverse linear dimensions at least 25%.

9. A method of producing a fine-grained solder which comprises melting a lead-base solder alloy consisting essentially of about 4.5% to 6% antimony, 0.3% to 0.6% arsenic, 0.25% to 3.5% tin and the balance substantially all lead, conveying the molten alloy to a chilled mold on a rotatable casting table, cooling said alloy in said mold at a rate of more than 20° F. per second above the liquidus temperature of said alloy and at a rate in excess of 6° F. per second in the temperature range between the liquidus and solidus temperature of said alloy, rotating said casting table at a constant rate which is adapted to permit said alloy to solidify in said mold in strip form, and thereafter compressing said strip to further refine its grain structure.

10. A method of producing a fine-grained solder which comprises melting at a temperature above 775° F. an alloy consisting essentially of about 4.5% to 6% antimony, 0.3% to 0.6% arsenic, 0.25% to 3.5% tin and the balance substantially all lead, conveying the molten alloy to a water-cooled mold affixed to a rotatable casting table, cooling said alloy in said mold at a rate of more than 20° F. per second above the liquidus temperature of said alloy and at a rate in excess of 6° F' per second in the temperature range between the liquidus and solidus temperatures of said alloy, rotating said casting table at a constant rate which permits said solder to solidfy in said mold in strip form by cooling at the aforesaid rates, conveying the resultant solder strip to a press and compressing said strip to reduce its thickness at least 25%.

11. A process for continuously producing a fine-grained solder for soldering sheet steel automobile bodies and the like which comprises melting in a furnace an alloy consisting essentially of about 4.5% to 6% antimony, 0.3% to 0.6% arsenic, 0.25% to 3.5% tin and the balance substantially all lead, conveying the molten alloy from said furnace to a metal mold located on the upper surface of a rotatable casting table, cooling said mold with a liquid coolant, rotating said table at a constant rate sufficient to permit and given portion of said alloy to solidfy and cool in said mold at a rate of more than 20° F. per second above the liquidus temperature of said alloy and at a rate in excess of 6° F. per second in the temperature range between the liquidus and solidus temperatures of said alloy while said alloy portion is being conveyed from the location in said mold at which the molten alloy is introduced thereto to the location in said mold at which solidified alloy is removed therefrom, conveying the solidified alloy formed in said mold from said casting table to a press, and thereafter compressing the solidified alloy in said press to reduce its thickness at least 25%.

12. A process for producing fine-grained lead base alloy solder bars which comprises alloying and melting in a furnace a solder consisting essentially of about 5% to 5.25% antimony, 0.45% to 0.6% arsenic, 2% to 2.75% tin and the balance substantially all lead, heating said solder to a temperature of approximately 775° to 825° F., conveying the molten solder at a temperature of at least 775° F. from said furnace to an annular copper mold located on the upper surface of a rotatable casting table, continuously cooling said copper mold with water flowing in contact with it, continuously rotating said table at a constant rate sufficient to permit any given portion of said solder to solidfy and cool in said mold at a rate of more than 40° F. per second above the liquidus temperature of said solder and at a rate in excess of 12° F. per second in the temperature range between the liquidus and solidus temperature of said solder while said solder portion as being conveyed from the location in said mold at which the molten solder is introduced thereto to the location in said mold at which solidified solder is removed therefrom in strip form, continuously conveying said solder strip from said table to a press, compressing the solidified solder strip in said press to reduce the thickness of said strip approximately 25% to 75%, and thereafter cutting the cold worked solder strip thus produced into suitable lengths.

13. An apparatus for continuously producing a fine-grained lead-base solder, said apparatus comprising a furnace for melting said solder and heating it to a temperature of at least 775° F., a casting table having a horizontally disposed rotatable wheel portion, an annular copper mold attached to said wheel portion adjacent its periphery, said mold having a casting cavity in the form of an annular groove in its upper surface, a water jacket within said wheel portion for cooling the solder in said mold at a rate of more than 20° F. per second above the liquidus temperature of said solder and at a rate in excess of 6° F. per second in the temperature range between the liquidus and solidus temperatures of said solder, means for continuously introducing cooling water to said water jacket, means for continuously removing water from said jacket, a pump for conveying molten solder from said furnace to said mold cavity, a vertical reciprocating press for compressing solidified solder strip formed in said cavity and reducing its thickness at least 25%, a slack loop trough for guiding the as-cast solder strip form from said casting table to a location between the dies of said press, a motor for rotating said wheel portion at constant speed to transfer the solder from the portion of said mold cavity adjacent the outlet from said pump to the inlet of said trough, means for intermittently feeding said solder strip to said press, means for operating a movable die of said press in timed sequence with the intermittent movement of said solder strip, means associated with said press for cutting the cold worked solder strip into suitable lengths and means for removing said lengths of solder strip.

References Cited by the Examiner

UNITED STATES PATENTS

| | | | |
|---|---|---|---|
| 54,120 | 4/66 | Crooke | 75—166 |
| 379,137 | 3/88 | Stover | 22—57.3 |
| 395,684 | 1/89 | Baker | 22—57.3 X |
| 405,914 | 6/89 | Schultz | 22—57.3 |
| 500,125 | 6/93 | Guttner | 75—166 |
| 1,900,182 | 3/33 | Jackson | 75—166 |

WHITMORE A. WILTZ, *Primary Examiner.*

UNITED STATES PATENT OFFICE
CERTIFICATE OF CORRECTION

Patent No. 3,197,862                                        August 3, 1965

Douglas J. Harvey

It is hereby certified that error appears in the above numbered patent requiring correction and that the said Letters Patent should read as corrected below.

Column 2, line 62, for "vertually" read -- virtually --; column 6, line 36, for "work" read -- worked --; column 7, line 53, for "4.08%" read -- 5.08% --; line 54, for "arsenicc" read -- arsenic --; line 56, for "cooper" read -- copper --; column 8, line 32, after "consisting" insert -- essentially --; column 9, lines 44 and 58, for "temperature", each occurrence, read -- temperatures --; line 71, for "6° F'" read -- 6° F. --; column 10, line 13, for "and", first occurrence, read -- any --; line 43, for "temperature" read -- temperatures --; same column 10, line 44, for "as" read -- is --.

Signed and sealed this 21st day of June 1966.

(SEAL)
Attest:

ERNEST W. SWIDER                                            EDWARD J. BRENNER
Attesting Officer                                         Commissioner of Patents